March 27, 1934.  J. E. SMITH  1,952,733
MOTOR
Filed July 17, 1928   2 Sheets-Sheet 1

INVENTOR
John E. Smith
BY
ATTORNEY

March 27, 1934.    J. E. SMITH    1,952,733

MOTOR

Filed July 17, 1928    2 Sheets-Sheet 2

INVENTOR
John E. Smith
BY
ATTORNEY

Patented Mar. 27, 1934

1,952,733

UNITED STATES PATENT OFFICE 1,952,733

MOTOR

John E. Smith, Plainfield, N. J.

Application July 17, 1928, Serial No. 293,362

21 Claims. (Cl. 53—3)

My invention relates to improvements in motors and aims to provide a motor which is energized by heat, fluid pressure, and gravity.

An object of my invention is to provide a motor of rotary type which is intermittent in its operation.

A further object is to provide a motor in which the moving part has an angular reciprocating motion.

Another object is to provide a motor of the character described above in which the stroke of the moving part may be varied either as to extent or as to frequency or both.

Another object is to provide an oscillating motor which may be set to stop automatically after completing a cycle of operations.

My improved motor is not only a prime mover but may be adapted for a wide variety of uses, such for instance, as a thermostatic control device, an automatic cooker, an automatic sterilizer, an automatic apparatus for preparing beverages, etc.

My motor is of particular utility when used as an automatic coffee making apparatus and I have chosen, for a specific example of my invention, to illustrate and describe my motor as an automatic coffee making apparatus. It will be understood, however, that I do not limit myself to such specific application or adaptation of my invention.

As a result of recent studies of coffee and its preparation as a beverage, it has been demonstrated that the ground coffee must not be subjected to water at a temperature of more than 203° Fahrenheit, else certain disagreeable oils will be extracted, spoiling the aroma of the coffee; and the temperature of the water must be at least 195°, in order to extract all the desirable essence. It has been shown, further, that the hot water, even when maintained within the ideal range of temperature above given, must not contact with the ground coffee for more than a very brief period, (say two minutes) because certain of the undesirable elements will be extracted if subjected to water at such temperature for a prolonged period.

My invention provides an apparatus in which the ideal conditions for making coffee will be complied with and in which the apparatus will be automatically regulated so that there will be no variation in the coffee extracted and the resultant beverage will be the best that can be obtained from any given quality or blend of ground coffee.

In the accompanying drawings, Fig. 1 is a view in vertical section of my improved motor adapted for use as an automatic coffee making apparatus;

In general, my improved coffee making apparatus comprises two receptacles suspended from a cross arm mounted to turn on an axis that is slightly inclined from the vertical. The cross arm is tubular and forms part of a siphon which enters the two receptacles. One of the receptacles is filled with water and constitutes a boiler and condenser, while the other, when the motor is used for coffee making, receives a measured quantity of ground coffee and constitutes an extractor. Coffee is made by passing water from the boiler into the extractor and then drawing the extract back into the boiler.

Figure 1:
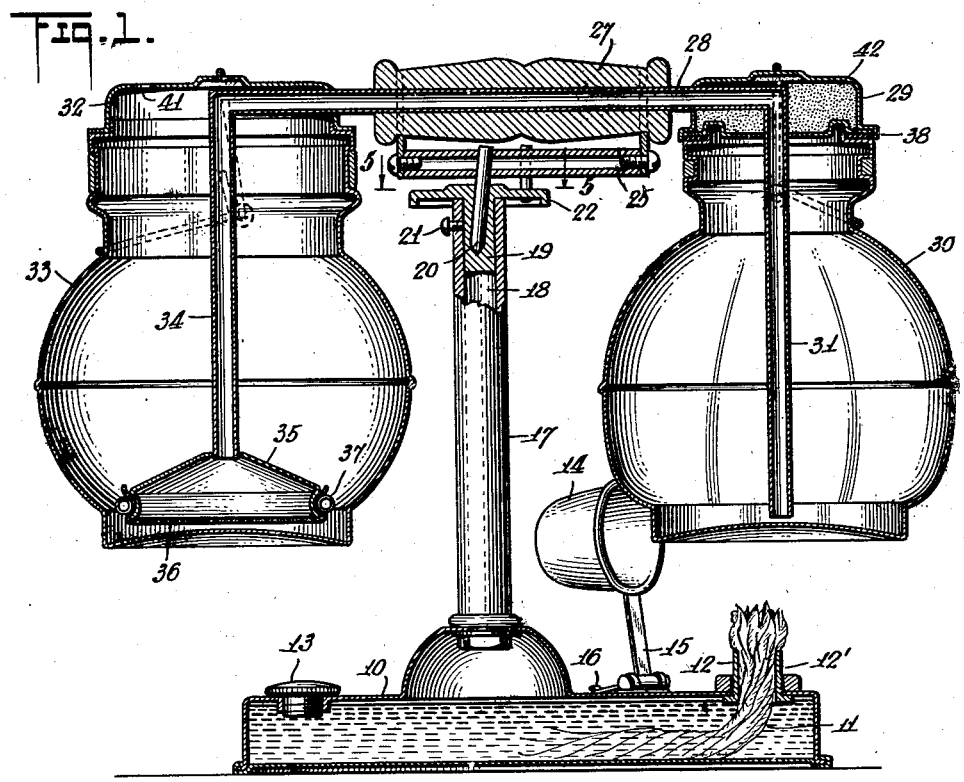
Figure 2:
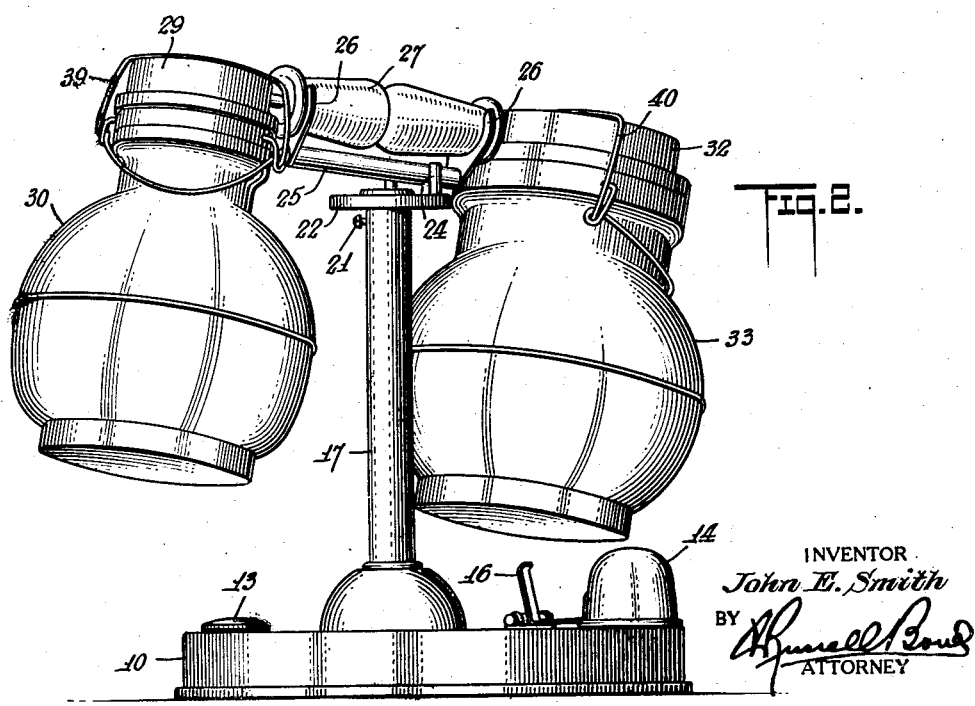
Fig. 2 is a front elevation of the apparatus showing the parts in a different position.

The apparatus comprises a base 10 which may be in the form of a reservoir for fuel having a wick 11 therein which projects through a burner 12 from the upper face of the reservoir. Suitable means 12' are provided for raising and lowering the wick. On the side opposite the burner, the reservoir is formed with a filling port normally closed by a plug 13. Adjacent the burner is a snuffer cap 14 carried by an arm 15 hinged to the base. The arm 15 is provided with an angular extension 16 which serves as a support for the snuffer when swung to idle position clear of the burner, as shown in Fig. 1. When the snuffer is in snuffing position, as shown in Fig. 2, it closes over the burner and at such time the extension 16 projects upwardly and provides a handle for swinging the snuffer back to idle position.

Figure 5:
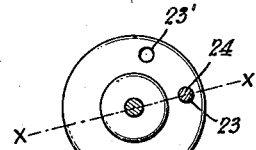
Fig. 5 is a fragmentary view in section taken on the line 5—5 of Fig. 1.

Rising from the base is a standard 17 formed at its upper end with a socket 18 in which is fitted a bearing member 19. The latter is formed with a bore which is slightly inclined with respect to the axis of the standard and in which a bearing pin 20 is adapted to turn. The bearing member is adjustable angularly in the socket and may be held at the desired adjustment by means of a set screw 21. The outer end of the member 19 is formed with an annular flange 22 which, as shown in Fig. 5, is provided with openings 23 and 23' to receive one or more stop pins 24, the purpose of which will be explained hereinafter.

The bearing pin 20 is fixed to a stem 25 and at opposite ends of the stem are brackets which support a substantially horizontal handle 27 preferably of wood or of some other heat insulating material. Projecting axially through the handle is a tube 28 which constitutes the cross arm above referred to. One end of the tube 28 penetrates and has secured thereto a lid 29 of a receptacle 30 and the tube is formed with a depending extension 31 which extends into the receptacle to a point near the bottom thereof. The other end of the tube 28 penetrates and has secured thereto a lid 32 of another receptacle 33 which is somewhat larger than the receptacle 30. A depending extension of the tube 28 projects well into the receptacle 33 and terminates at its lower end in an inverted funnel 35. Stretched over the mouth of the funnel is a filter 36 which is retained on the funnel by an elastic band 37 consisting preferably of spirally coiled wire spring seated in an annular depression in the funnel.

The receptacle 30 serves as the boiler and condenser and it is essential that the lid 29 be secured air tight thereon. To this end, a gasket 38 of rubber or other suitable material is fitted on the mouth of the receptacle and the lid is pressed tightly against the gasket by a suitable clamp 39. The latter may be of any suitable type which can be conveniently adjusted to clamping or unclamped position. Similarly, the other receptacle 33 which I call the extractor, is secured to the lid 32 by means of a suitable clamp 40. A port 41 in the lid 32 permits air to flow freely into or out of the extractor. It will be observed that the two receptacles 30 and 33 are suspended by means of the clamps from the respective lids which are carried by the stem 25 and that the latter is mounted on the journal pin 20.

Figure 3:
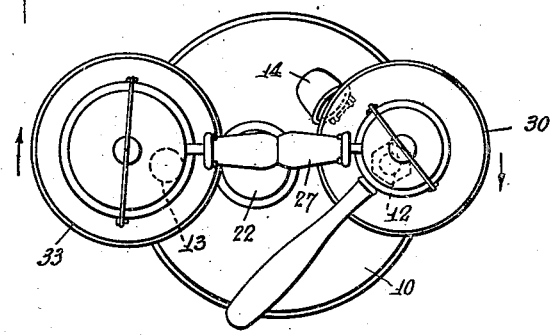
Fig. 3 is a top plan view of the apparatus showing the parts in the same position as they occupy in Fig. 1.

The pin 20 is preferably set at such an angle with respect to the stem 25 that the handle 27 will lie horizontal when the parts are in the position shown in Fig. 1 with the boiler 30 directly over the burner 12. Obviously, because of the inclination from the vertical of the bearing pin, there will be a tendency for the parts to swing around until the heavier receptacle is in its lowermost position. When both receptacles are empty, the boiler, even though smaller than the extractor, is heavier than the extractor because of a weight 42 embedded in the lid 29. The bearing member 19 is angularly adjusted so that the vertical plane in which the pin 20 lies will pass through the opening 23 in the flange 22. This plane is indicated in Fig. 5 by the broken line X—X and is virtually a dead center plane. The boiler, because of its greater weight, tends to swing counter-clockwise, as viewed in Fig. 3, into said plane but is prevented from reaching dead center by engagement of the stop pin 24 with the stem 25. If, however, the extractor is made heavier than the boiler, the parts will tend to turn clockwise from the position shown in Fig. 3 to that shown in Fig. 4 and the extractor will be arrested before reaching dead center by engagement of the stem 25 with the opposite side of the pin 24.

If desired, a pin may be inserted in the opening 23' to stop the movement of the extractor after it has turned through an angle of approximately 90°.

The operation of the apparatus is as follows: The boiler and extractor are lifted off the standard and the clamps 39 and 40 are released to permit of removing the siphon therefrom. A measured amount of water is then placed in the boiler and a measure of ground coffee is placed in the extractor. The amount of ground coffee used will determine the strength of the beverage. The receptacles are then clamped to their respective lids and it will be observed that because of the difference in size of the two lids, there will be no danger of attaching the extractor to the boiler lid and the boiler to the extractor lid. The boiler and extractor are then mounted on the standard with the pin 20 in the bearing member 19. The snuffer cap is raised to the position shown in Fig. 1 and the wick 11 is lighted. As explained above, the boiler tends normally to lie above the burner with the stem 25 resting against the stop pin 24, and this tendency is further increased by the additional weight of water in the boiler. As the water is heated, pressure is developed in the boiler which forces the water out of the boiler through the siphon and into the extractor 33. This pressure may be due to the formation of vapor or to the expansion of occluded air in the water or both. At any rate, repeated experiments have shown that the transfer of water from the boiler takes place well below the boiling point. It has been determined by careful tests that the transfer takes place at a temperature of about 195° Fahrenheit when cold water is placed in the boiler and when preheated water is used, the point at which the transfer takes place does not exceed 203° Fahrenheit.

Figure 4:
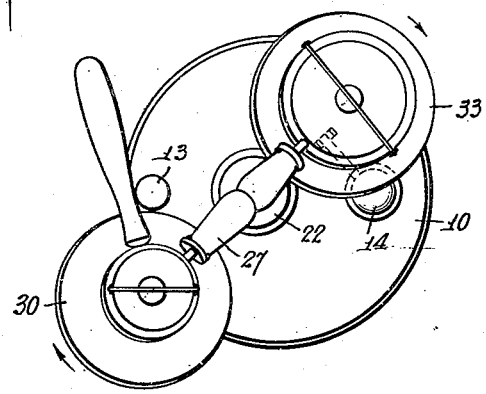
Fig. 4 is a top plan view showing the parts in the position they occupy in Fig. 3.

When the water has been transferred from the boiler to the extractor, the latter outweighs the boiler and consequently the receptacles swing around to the position shown in Fig. 4, moving the boiler away from the burner. At the same time, the extractor strikes the snuffer cup 14 causing the latter to drop over and snuff out the flame at the burner. When the boiler is moved away from the burner, it cools very rapidly, and within a minute or two the vapor in the boiler 30 will have condensed to such an extent as to produce a partial vacuum therein. As a result, the liquid in the extractor 33 will be forced by atmospheric pressure back through the siphon into the boiler. The water, while in the extractor, contacts with the ground coffee, producing the desired coffee infusion or extract and this extract, on returning to the boiler through the siphon, is strained by the filter 36. On return of the coffee to the boiler 30, the latter will again outweigh the extractor and the parts will return to the position shown in Fig. 3. The operator will then know that the making of the coffee has been completed and may unclamp the boiler from the lid. It will be observed that the boiler is provided with a handle 43 which may be conveniently used to handle the hot boiler when pouring the coffee out therefrom.

As explained above the strength of the coffee will depend upon the quantity of ground coffee used per cup of water. A stronger extract may also be obtained by using more than a single pass of the water into and out of the extractor 33. This result is obtained automatically by inserting a pin into the opening 23'. As a result, when the water passes from the boiler 30 into the extractor, the latter will be arrested by the pin 23' before it has moved far enough to throw the snuffer cap 14 over the flame. Hence, the flame will continue to burn and after the coffee has returned to the boiler 30, the latter will swing back to the position shown in Fig. 1 and will again be heated by the flame causing a second transfer of the liquid from the boiler into the extractor. This transfer may be repeated as many times as desired and may be arrested at any time by dropping the cap 14 over the burner. Thus, my invention provides for producing any degree of coffee infusion that may be required. It will be observed that by shifting the plane X—X, the tendency of the parts to turn will be varied and overbalancing may occur before all of the liquid in the boiler 30 has been transferred to the extractor 33 or vice versa. Obviously, the frequency of oscillation of the apparatus may be varied by adjusting the part 12' to raise or lower the wick.

Figure 6:
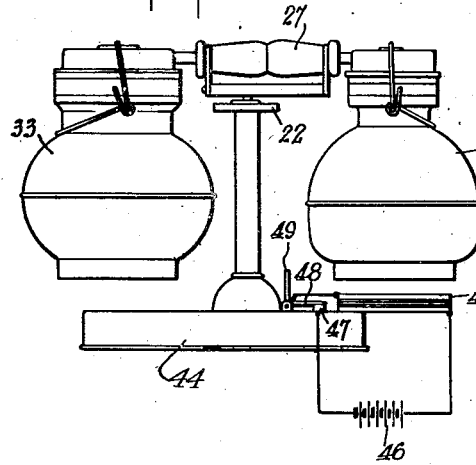
Fig. 6 is a front elevation of a different form of my invention in which a motor is energized by an electric resistance unit.

The apparatus shown in Fig. 6 is similar to that shown in Figs. 1 to 5 except that I use an electric resistance unit to operate the motor instead of a burner. In place of the hollow base or reservoir 10, I use a solid base 44 which carries an electric resistance unit 45 directly under the point which the boiler 30 normally occupies. This resistance unit is electrically connected to any suitable source of electrical energy such as indicated at 46. In the circuit of the resistance unit, there is a switch comprising a fixed contact point 47 and a switch arm 48. The arm 48 is hinged to the base 44 and is provided with an angular extension or handle 49 which lies in the path of the extractor when the switch is closed. The operation of this apparatus is identically like that described above except that in this case, the extractor 33 strikes the arm 49 throwing the switch open and thus disconnecting the resistance unit 45 to de-energize the latter. If, however, a pin is placed in the opening 23', the extractor 33 cannot swing far enough to throw the switch open, and consequently, the resistance unit will remain energized and will heat the boiler 33 whenever it comes back to position thereover, thus causing the apparatus to oscillate as long as the switch remains closed.

Figure 7:
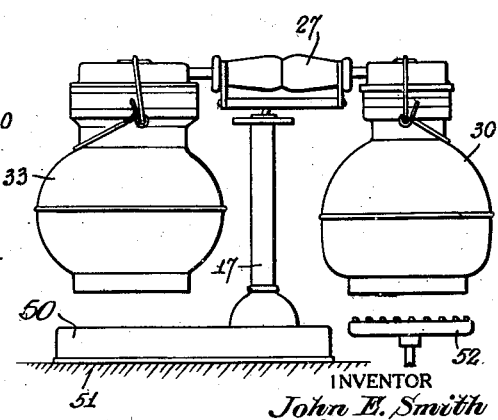
Fig. 7 is a front elevation of still another form of my invention adapted to be placed on a gas range.

The apparatus shown in Fig. 7 is similar to the apparatus shown in the other figures except that it has no burner or heating unit but is adapted to be used on an ordinary gas or oil range; also it is not provided with automatic means for turning off the heat. As shown in Fig. 7, a solid base 50 is used for the apparatus, which base is offset with respect to the standard 17 so that the apparatus may be placed on a range 51 with the boiler 30 overlying a burner 52 of the range. When the burner is lighted, the moving parts of the apparatus will oscillate back and forth as the liquid is alternately transferred from the boiler 30 to the extractor 33, then back again, and this oscillation will continue as long as the burner 52 is lighted.

I have referred to my apparatus as a thermostatic control device. I have found by experiment, as explained above, that when cold water is placed in the boiler 30, a transfer of water from the boiler to the extractor will take place when the water has been raised to a temperature of approximately 195° Fahrenheit. On the second pass of the water, the temperature will be somewhat higher and after a number of passes, the temperature will reach a maximum of approximately 203 degrees in the boiler and will drop to 201 degrees in the extractor before returning to the boiler. The apparatus will continue to oscillate without a variation of more than two degrees in the liquid as it passes from one receptacle to the other. Obviously, other liquids may be used beside water which will maintain a fixed temperature at some other point in the Fahrenheit scale.

It will be understood that I do not limit myself to the details of construction and arrangements of parts illustrated, and consider myself at liberty to make such variations as fall within the spirit and scope of the appended claims.

I claim:

1. In a method of generating power, the steps which consist in subjecting a liquid in a closed vessel to the influence of heat to generate vapor under pressure, utilizing said vapor pressure to transfer the liquid to a second vessel, utilizing the weight of the liquid in said second vessel to remove the first vessel from said heat influence, thereby condensing the vapor in the first vessel and permitting the liquid in the second vessel to be forced by atmospheric pressure back into the first vessel, and utilizing the weight of liquid in the latter vessel to return the same to its original position.

2. A motor comprising a base, a siphon mounted to oscillate on the base about an axis slightly inclined from the vertical, a pair of receptacles respectively secured to and communicating with the siphon at opposite ends thereof and means for sealing one of said receptacles.

3. A motor comprising a base, a siphon mounted to oscillate on the base about an axis slightly inclined from the vertical, a pair of receptacles respectively secured to and communicating with the siphon at opposite ends thereof and means for sealing one of said receptacles, the other receptacle being open to atmospheric pressure.

4. A motor comprising a siphon, a filter therefor, a base on which the siphon is mounted to oscillate about an axis slightly inclined from the vertical, a pair of receptacles respectively secured to and communicating with the siphon at opposite ends thereof, and means for sealing one of said receptacles, the other receptacle being open to atmospheric pressure.

5. A motor comprising a base, a siphon mounted to oscillate on the base about an axis slightly inclined from the vertical, and a pair of receptacles respectively removably secured to the siphon on opposite sides of said axis and into which receptacles the opposite ends of the siphons project, one of said receptacles being sealed air tight and the other being open to atmospheric pressure.

6. A motor comprising a base, a siphon mounted to oscillate on the base about an axis slightly inclined from the vertical, a pair of receptacles respectively removably secured to the siphon on opposite sides of said axis and into which receptacles the opposite ends of the siphon project, one of said receptacles being sealed air tight and the other being open to atmospheric pressure, the end of the siphon in the latter receptacle having an enlarged mouth, and a filter removably secured over said mouth.

7. A motor comprising a base, a siphon mounted to oscillate on the base about an axis slightly inclined from the vertical, a pair of receptacles respectively secured to the siphon on opposite sides of the said axis and into which receptacles opposite ends of the siphon project, one of the receptacles being sealed and normally outweighing the other.

8. A motor comprising a pair of receptacles, a siphon having depending legs adapted respectively to enter the receptacles, a lid for each receptacle fixed to the siphon, clamps adapted to secure the lids to the receptacles, and a base on which the siphon is mounted to oscillate about an axis other than vertical.

9. A motor comprising a pair of receptacles, a siphon having depending legs adapted respectively to enter the receptacles, a lid for each receptacle secured to the siphon, clamps adapted to secure the lids to the receptacles, a base on which the siphon is mounted to oscillate about an axis other than vertical, and adjustable stop means upon the base for limiting oscillation of the siphon.

10. A motor, comprising a pair of receptacles, a siphon having depending legs adapted respectively to enter said receptacles, a lid for each receptacle secured to the siphon, clamps adapted to secure the lids to the receptacles, a pivot pin carried by the siphon intermediate the receptacles, a base providing a bearing slightly inclined from the vertical for said pin, and means for limiting oscillations of the siphon in response to variations of relative weight of the receptacles.

11. A motor, comprising a pair of receptacles, a siphon having depending legs adapted respectively to enter said receptacles, a lid for each receptacle secured to the siphon, clamps adapted to secure the lids to the receptacles, a pivot pin carried by the siphon intermediate the receptacles, a bearing member adjustable on the base and providing a bearing slightly inclined from the vertical for said pin, and means for limiting oscillations of the siphon in response to variations of relative weight of the receptacles, said bearing member being adjustable about a vertical axis to vary the angular position of the plane of the bearing.

12. A motor comprising a base, a siphon mounted to oscillate on the base about an axis slightly inclined from the vertical, receptacles secured to and communicating with the siphon at opposite ends thereof, one of the said receptacles outweighing the other whereby the heavier receptacle will tend to move by gravity toward a fixed point, and a heating unit carried by the base at such point.

13. A motor comprising a base, a siphon mounted to oscillate on the base about an axis other than vertical, a boiler detachably secured to and communicating with the siphon at one end thereof, a receptacle detachably secured to and communicating with the other end of the siphon, the boiler tending normally to move by gravity toward a fixed point, a heating unit carried by the base and adapted to cause transfer of liquid from the boiler to the receptacle, thereby causing the receptacle to move by gravity toward said point, and means being operable by engagement with said receptacle for de-energizing the heating unit.

14. A coffee making apparatus, comprising a receptacle adapted to receive a quantity of ground coffee, a boiler for water, a siphon connecting and supporting the receptacle and the boiler, a base on which the siphon is mounted to oscillate about an axis slightly inclined from the vertical, a heating unit on the base for heating the boiler, and a control device for the heating unit adapted to be operated by movement of the siphon about its axis.

15. A coffee making apparatus comprising a receptacle adapted to receive a quantity of ground coffee, a boiler for water, a siphon connecting and supporting the receptacle and the boiler, a base on which the siphon is mounted to oscillate about an axis other than vertical between the receptacle and the boiler, a heating unit on the base for heating the boiler and a control device for the heating unit including a part projecting in the path of said receptacles, and adapted, when struck by the said receptacle to turn off the heat.

16. A coffee making apparatus comprising a receptacle adapted to receive a quantity of ground coffee, a boiler for water, a siphon connecting and supporting the receptacle and the boiler, a base on which the siphon is mounted to oscillate about an axis other than vertical between the receptacle and the boiler, a heating unit on the base for heating the boiler, a control device for the heating unit including a trip arm projecting in the path of said receptacle, and adapted, when struck by the said receptacle to turn off the heat, and a stop adjustable to prevent the receptacle from striking said trip arm.

17. In a method of generating power, the steps which consist in subjecting a liquid in a closed vessel to the influence of heat to generate vapor under pressure, utilizing said vapor pressure to transfer the liquid to a second vessel, utilizing weight of the liquid in said second vessel to remove the first vessel from said heat influence and to cut off said heat, thereby condensing the vapor in the first vessel and permitting the liquid in the second vessel to be forced by atmospheric pressure back into the first vessel, and utilizing the weight of liquid in the first vessel to return the same to its original position.

18. A coffee making apparatus comprising a receptacle adapted to receive a quantity of ground coffee, a boiler for water, a siphon connecting and supporting the receptacle and the boiler, a base on which the siphon is mounted to oscillate about an axis slightly inclined from the vertical, a burner on the base for heating the boiler and a snuffer for the burner adapted to extinguish the burner, said snuffer being operated by movement of the siphon about its axis.

19. A coffee making apparatus comprising a receptacle adapted to receive a quantity of ground coffee, a boiler for water, a siphon connecting the receptacle and the boiler, a base on which the boiler and receptacle are mounted to oscillate about an axis other than vertical, a snuffer for extinguishing the burner, said snuffer when in open position projecting in the path of said receptacles and adapted when struck by one of said receptacles to extinguish the burner.

20. A method of making coffee which consists in introducing water into one of a pair of connected vessels and ground coffee into the other of the pair, alternately heating and cooling the first vessel to cause variation of vapor pressure therein and consequent alternate transfer of the liquid between the vessels, utilizing the variation of center of gravity due to such transfer to oscillate said vessels to and fro, and utilizing such oscillation of the vessels to control the alternate heating and cooling of said first vessel.

21. A method of making coffee which consists in introducing water into one of a pair of connected vessels and ground coffee into the other of the pair, alternately heating and cooling the first vessel to cause variation of vapor pressure therein and consequent alternate transfer of the liquid between the vessels, utilizing the variation of center of gravity due to such transfer to oscillate said vessels to and fro, utilizing such oscillation of the vessels to control the alternate heating and cooling of said first vessel, and filtering the liquid during the transfer thereof to prevent the ground coffee from entering said first vessel.

JOHN E. SMITH.